US008641512B2

(12) United States Patent
Hsu

(10) Patent No.: US 8,641,512 B2
(45) Date of Patent: *Feb. 4, 2014

(54) APPARATUS FOR DICE TABLE GAMES

(76) Inventor: Tien-Shu Hsu, Taichung (TW)

( * ) Notice: Subject to any disclaimer, the term of this patent is extended or adjusted under 35 U.S.C. 154(b) by 129 days.

This patent is subject to a terminal disclaimer.

(21) Appl. No.: 13/299,156

(22) Filed: Nov. 17, 2011

(65) Prior Publication Data

US 2013/0130776 A1 May 23, 2013

(51) Int. Cl.
*A63F 9/24* (2006.01)
*A63F 13/00* (2006.01)

(52) U.S. Cl.
USPC .............................................. 463/22; 463/17

(58) Field of Classification Search
USPC .............. 463/22, 13, 16–20, 25, 29; 273/146, 273/268, 274
See application file for complete search history.

(56) References Cited

U.S. PATENT DOCUMENTS 5,513,851 A * 5/1996 Harris .......................... 273/274
7,309,065 B2 * 12/2007 Yoseloff et al. ............... 273/292
8,074,991 B2 * 12/2011 Chen et al. .................... 273/274
2003/0153384 A1 * 8/2003 Duhamel ....................... 463/29
2007/0298868 A1 * 12/2007 Soltys ............................ 463/25
2008/0214294 A1 * 9/2008 Yoshizawa ...................... 463/25
2008/0248864 A1 * 10/2008 Toyoda .......................... 463/22
2009/0124316 A1 * 5/2009 Baerlocher et al. ............ 463/13
2009/0176547 A1 * 7/2009 Katz .............................. 463/13
2010/0062851 A1 * 3/2010 Kido .............................. 463/31
2011/0111833 A1 * 5/2011 Nordahl et al. ................ 463/22

* cited by examiner

*Primary Examiner* — Melba Bumgarner
*Assistant Examiner* — Anh Vo V Nguyen
(74) *Attorney, Agent, or Firm* — Muncy, Geissler, Olds & Lowe, PLLC

(57) ABSTRACT

An apparatus for dice table games aims to dynamically increase odds of a dice table game. The apparatus includes an electronic display panel which has at least one display zone to indicate a corresponding betting area and display dynamic raised odds. Banker can give a player a payout for his/her bet according to the dynamic raised odds. By providing the dynamic raised odds which might be greater than the payout odds of the betting area, the expected value of the dice table game is higher and players can expect extra awards from the disc table game, thus the appeal of the dice table game increases. As a result higher utilization of dice table game can be achieved and idle time can be reduced to avoid wastes.

8 Claims, 7 Drawing Sheets

APPARATUS FOR DICE TABLE GAMES

FIELD OF THE INVENTION

The present invention relates to a dice table game and particularly to an apparatus to increase appeal of dice table games.

BACKGROUND OF THE INVENTION

Dice table games generally are simple with easily understood rules, thus are quite popular. The games mainly include three dice each is a cube with six faces marked respectively with different numbers of dots (also called pips) to represent number from 1 to 6. The three dice are held in a dice cup, the dice cup is shaken for a short duration, then allow the three dice to rest still naturally to generate a random number to match at least one of pips combinations. The dice table game also provides a betting table for players to bet different pips combinations. Different pips combinations have different appearing probability and have different payout odds assigned to the betting table. In the event that the dice game shows a pips combination matching a player's betting pips combination, the player wins the bet and claims a payout according to the payout odds and player's betting wager.

The general dice table games at present adopt some common pips combinations, such as pips ranking (3-10 pips are small, 11-18 pips are big), pips total, special combinations (such as same pips number for three dice or two dice, designated pips number), etc. Different pips combinations have official payout odds, such as appearing of three "1" pips at the same time has the probability of 1/216, the odds generally is 1 pays 190, converted to player's profit rate about 88.4%.

Due to player's profit rate of betting various pips combinations usually is relatively low and constant, after a period of time the players could feel bored and not eager to participate. Hence after the novelty and excitement of the game decline, utilization of the dice table games gradually decreases and results in not satisfactory business outcome.

SUMMARY OF THE INVENTION

The primary object of the present invention is to provide an apparatus to dynamically increase odds of dice table games.

To achieve the foregoing object the invention provides an apparatus for dice table games that allows a banker and a player to play a dice table game. It includes three dice, a dice cup, a betting table and an electronic display panel. The dice are held in the dice cup and shaken, then are rested to still naturally to generate a random number to match at least one of pips combinations. The probability of generating the pips combinations is defined as a game probability.

The betting table has a plurality of betting areas corresponding to the pips combinations for the player to place bets. Each betting area has a payout odds. The multiplication product of the game probability and payout odds is player's profit rate. The payout odds has a given value and is controlled so that the player's profit rate is no greater than 100%.

The electronic display panel displays at least one display zone corresponding to the betting areas. The display zone displays a dynamic raised odds to give the banker priority to choose the higher one between the payout odds and dynamic raised odds as the payout for the player's bet. The dynamic raised odds is any one selected from a plurality of raised odds. The actual values and number of the raised odds can be randomly reset and given anew at the beginning of the dice table game. I.e., at the start of each game the actual values and number of the raised odds can be changed to meet use requirements.

Moreover, each of the raised odds has its appearing probability. The sum of multiplication products of all the raised odds and the corresponding appearing probability is an accumulated average odds. The multiplication product of the accumulated average odds and the game probability is a player's raised profit rate. All the raised odds and the corresponding appearing probability thereof can be controlled and adjusted to make the player's raised profit rate approximating a given targeted value.

Thus, through the apparatus of the invention the payout odds of the pips combinations can be substituted by the dynamic raised odds, i.e., the player who wins the bet can get the payout based on the dynamic raised odds with an increased player's profit rate. In addition, the dynamic raised odds are appeared and changed frequently, thus offer more appeal and excitements for the player to place bets. Therefore utilization of the dice table game can be enhanced to maximize business benefits. By controlling the player's raised profit rate within an acceptable range, desired business benefits can be maintained while utilization of the dice table increases.

The foregoing, as well as additional objects, features and advantages of the invention will be more readily apparent from the following detailed description, which proceeds with reference to the accompanying embodiments and drawings. The embodiments serve merely for illustrative purpose and are not the limitations of the invention.

DETAILED DESCRIPTION OF THE PREFERRED EMBODIMENTS

Figure 1:
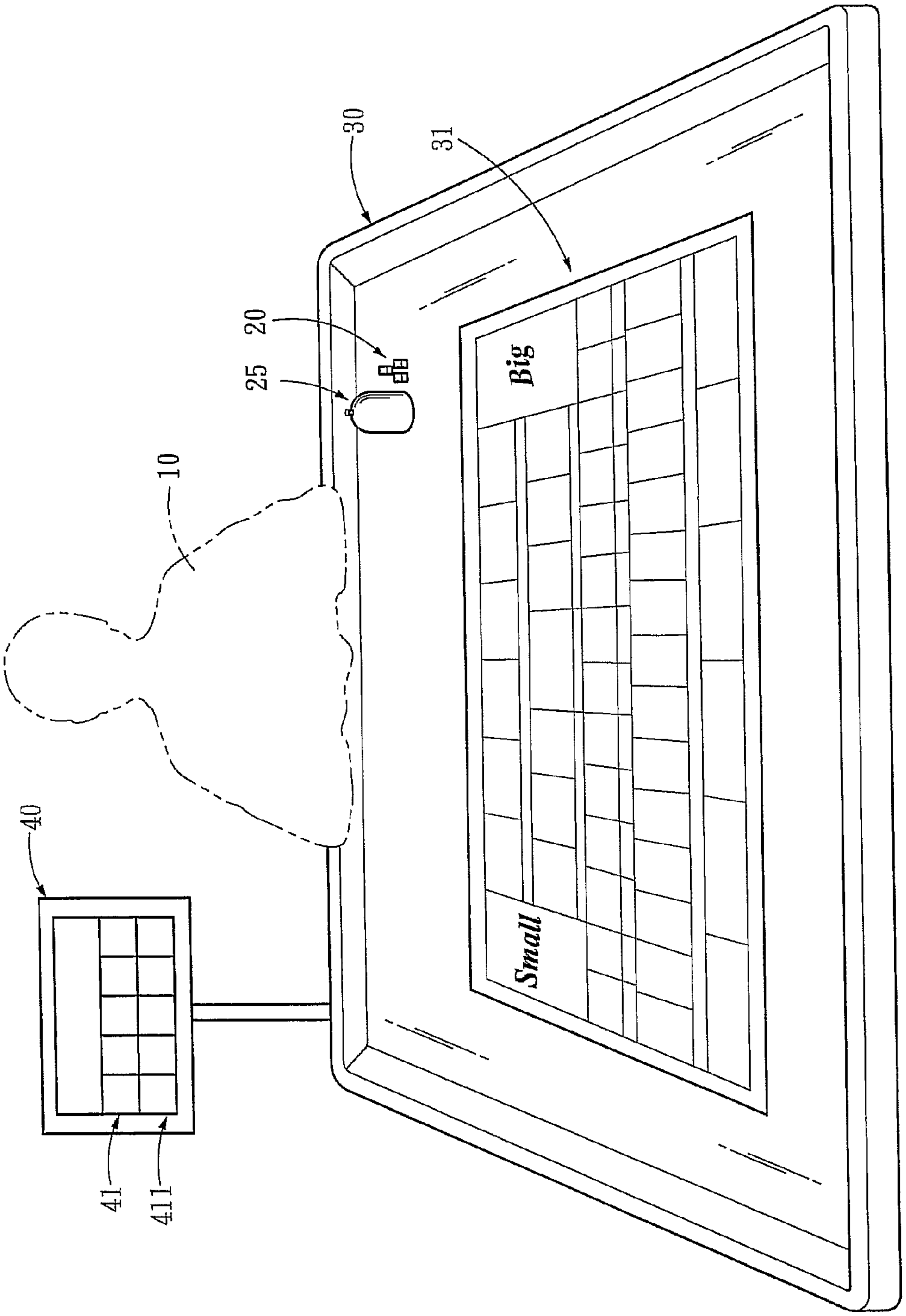
FIG. 1 is a schematic view of an embodiment of a real table of the invention.
Figure 2:
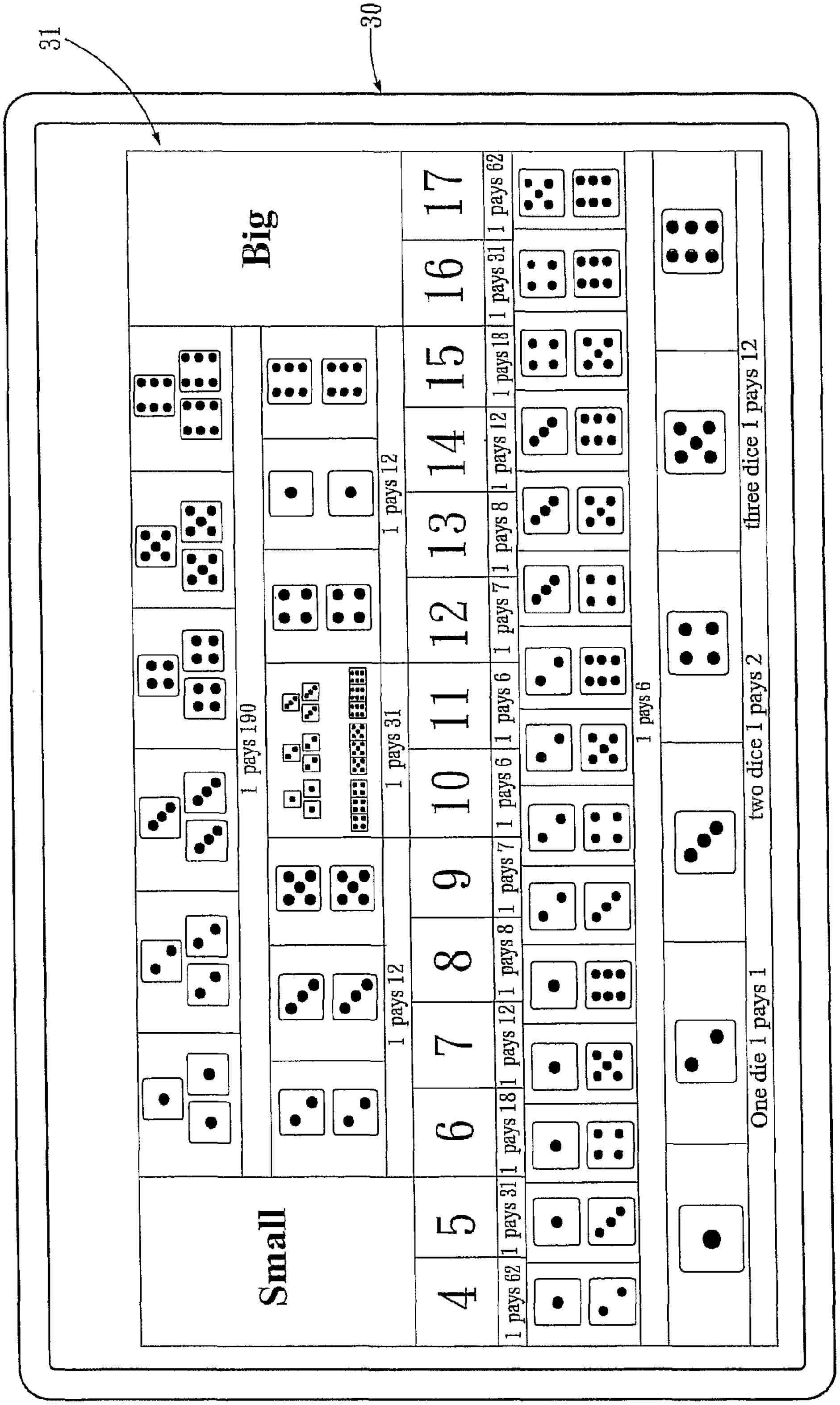
FIG. 2 is a schematic view of a betting table on a real table of the invention.
Figure 3:
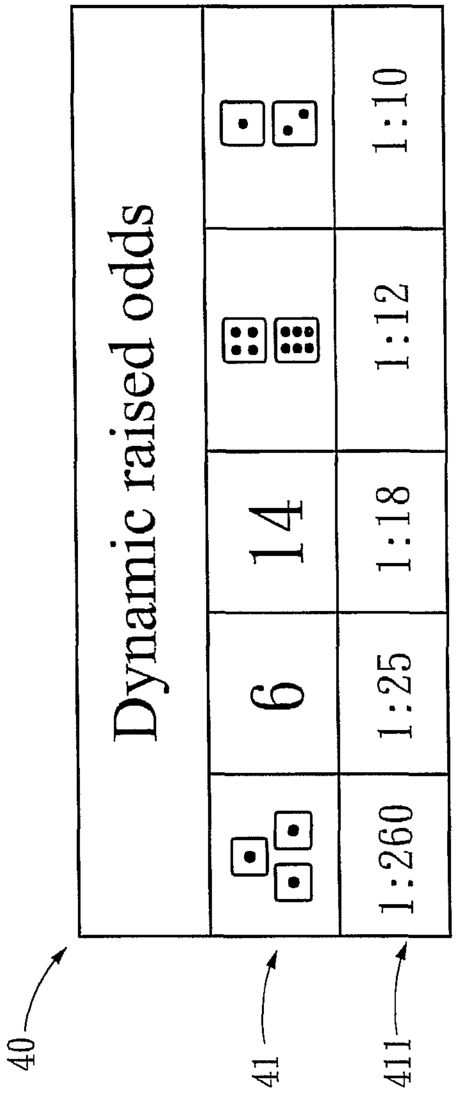
FIG. 3 is a schematic view of an electronic display panel of the invention.

Please refer to FIGS. 1, 2 and 3 for an embodiment with a dice table game using three dice as an example for discussion.

The present invention aims to provide an apparatus for a banker 10 and a player (not shown in the drawings) to play a dice table game. In this embodiment the apparatus includes three dice 20, a dice cup 25, a betting table 30 and an electronic display panel 40. The three dice 20 are held in the dice cup 25 and shaken, then are rested to still naturally to generate a random number to match at least one of pips combinations. The probability of generating the pips combinations is defined as a game probability.

Figure 4:
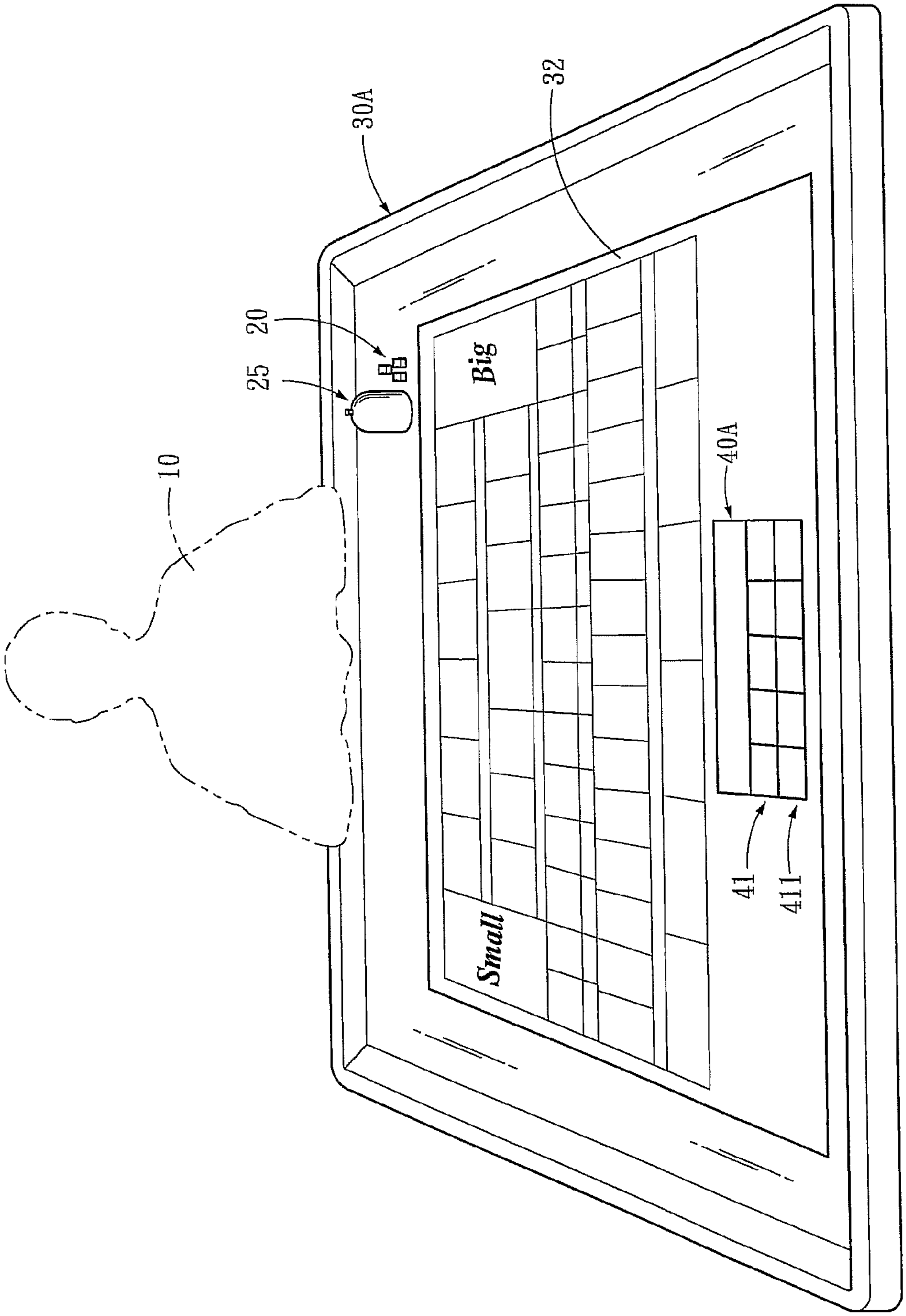
FIG. 4 is a schematic view of an embodiment of an electronic table of the invention.
Figure 5:
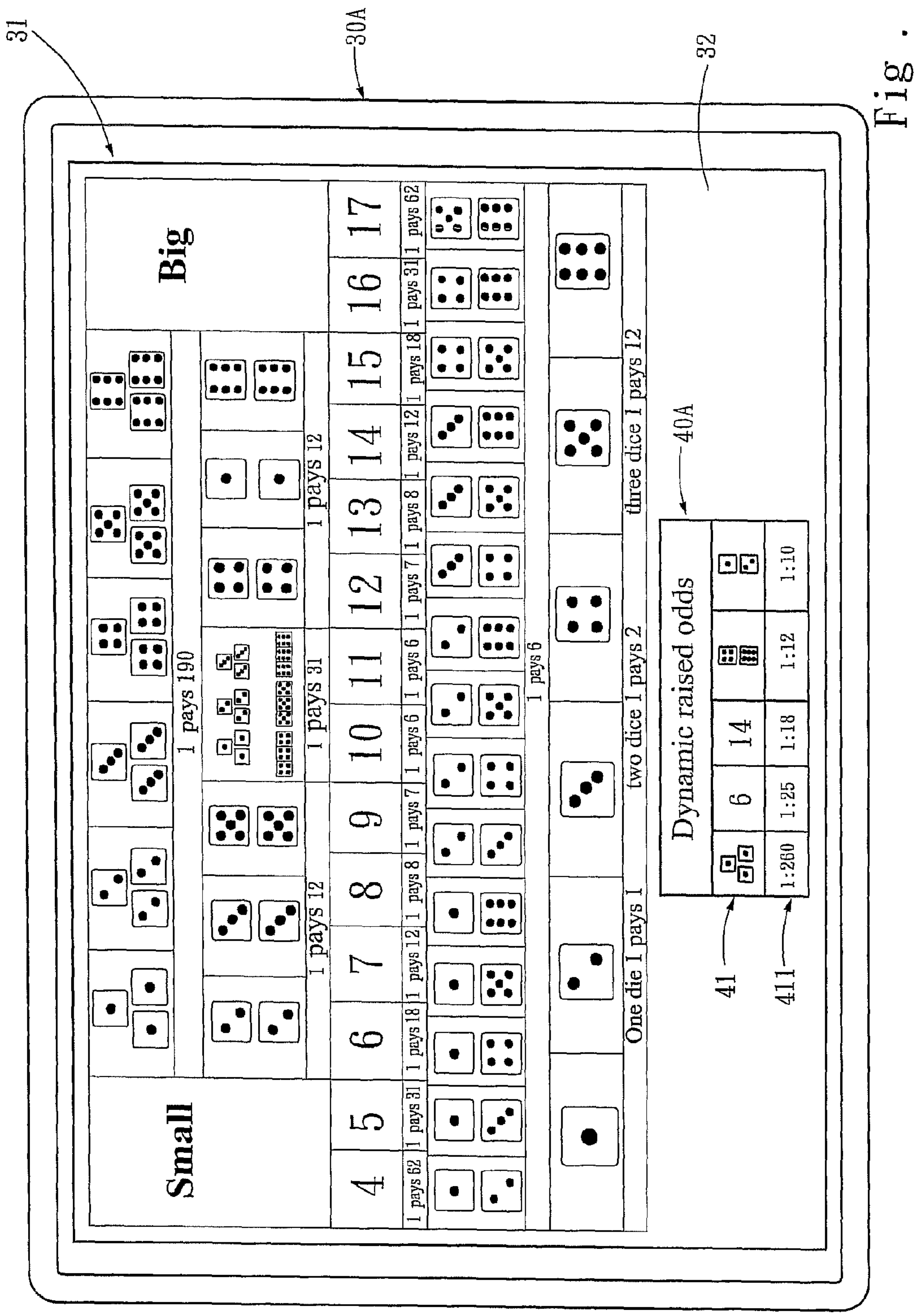
FIG. 5 is a schematic view of a betting table of an electronic table of the invention.

The betting table 30 can be formed by at least two types. FIG. 1 shows one type in which the betting table 30 is a real table with a plurality of betting areas 31 to indicate the pips combinations. The betting areas 31 are printed and labeled on the surface of the table. FIGS. 4 and 5 illustrate another type with the betting table 30A being an electronic table containing an electronic screen 32 to display the betting areas 31. The electronic screen 32 can be a touch screen.

The betting areas 31 allow the player to place a bet that have respectively a payout odds. The multiplication product of the game probability and payout odds is player's profit rate. The payout odds is a given value and controlled so that the player's profit rate is no greater than 100%. Depending on differences of game rules, the payout odds can be divided into returning player's bet and no-return of player's bet. The aforesaid calculation of player's profit rate includes returning player's bet in the payout odds, namely, the payout odds is equal to the multiple taken by the player upon winning the bet. If the payout odds does not include returning player's bet, the player's profit rate is modified to become the multiplication product of the sum of the payout odds and double of the bet (i.e. player's actual taking multiple upon winning the bet) with the game probability.

When the betting table 30 is a real table, the electronic display panel 40 can be mounted upright at one side of the betting table 30 (referring to FIG. 1). When the betting table 30A is an electronic one, the electronic display panel 40A can be incorporated in the electronic screen 32 of the betting table 30A (referring to FIG. 4).

The electronic panel 40 includes at least one display zone 41 corresponding to the betting areas 31. The display zone 41 displays a dynamic raised odds 411 to give the banker priority to choose a higher one between the payout odds and dynamic raised odds 411 as the payout for player's bet. The dynamic raised odds 411 is any one selected from multiple raised odds. The values and number of the raised odds are set by the banker. Each of the raised odds has an appearing probability. The accumulation sum of the multiplication products of the raised odds and their corresponding appearing probability is defined as an accumulated average odds. The multiplication product of the accumulated average odds and game probability is a player's raised profit rate. The raised odds and their corresponding appearing probability can be controlled and adjusted to make the player's raised profit rate approximating a set target value.

Similarly, if the dynamic raised odds 411 does not include returning the player's bet, the player's raised profit rate is modified to become the multiplication product of the accumulated average odds plus double of the bet (i.e. actual multiple taken by the player upon winning the bet) and game probability.

Take a pips combination of appearing three "1" at the same time as an example; the appearing probability is 1/216, the payout odds generally is 1 pays 190, converted to the player's profit rate about 88.4% (not including returning player's bet), and the set target value is 95% (i.e. house's benefit is 5%, determined by the house). The number of raised odds (not including returning player's bet) selectable for the dynamic raised odds 411 is 4, at values of 1 pays 190, 1 pays 230, 1 pays 260 and 1 pays 300; and their corresponding appearing probability, after being processed and adjusted, are 80%, 7%, 7% and 6%; namely, the appearing probability of the raised odds is 80% for 1 pays 190, 7% for 1 pays 230, 7% for 1 pays 260, and 6% for 1 pays 300. Incorporated the aforesaid values, the player's raised profit rate is calculated as follow:

$$(1+190*80\%+230*7\%+260*7\%+300*6\%)*1/216=95.04\%$$

The player's raised profit rate approximates 95%, thus can meet requirements.

Other pips combinations can also adopt the aforesaid approach of generating the dynamic raised odds 411 to generate different raised odds with varying appearing probability.

After the player has placed a bet on the betting areas 31 of the betting table 30, the dynamic raised odds 411 can be generated, and according to the appearing probability of the raised odds associated with the dynamic raised odds 411, the value of the raised odds can be determined. FIG. 3 illustrates the values of selected raised odds according to the dynamic raised payout odds 411 of a different pips combination based on an embodiment of the invention. The values can be reset anew at the beginning of each game to generate new values.

When the number of the betting areas 31 is not many the electronic display panel 40 can contain sufficient display zones 41 to mate the betting areas 31 in an one-to-one fashion. In the event that a greater number of the betting areas 31 exist (with the number of the display zones 41 smaller than that of the betting areas 31), a free choice is provided as required, and the display zones 41 can be dynamically selected to mate the betting areas 31, and the raised odds with values different from the previous payout odds is selected at a higher priority.

Figure 6:
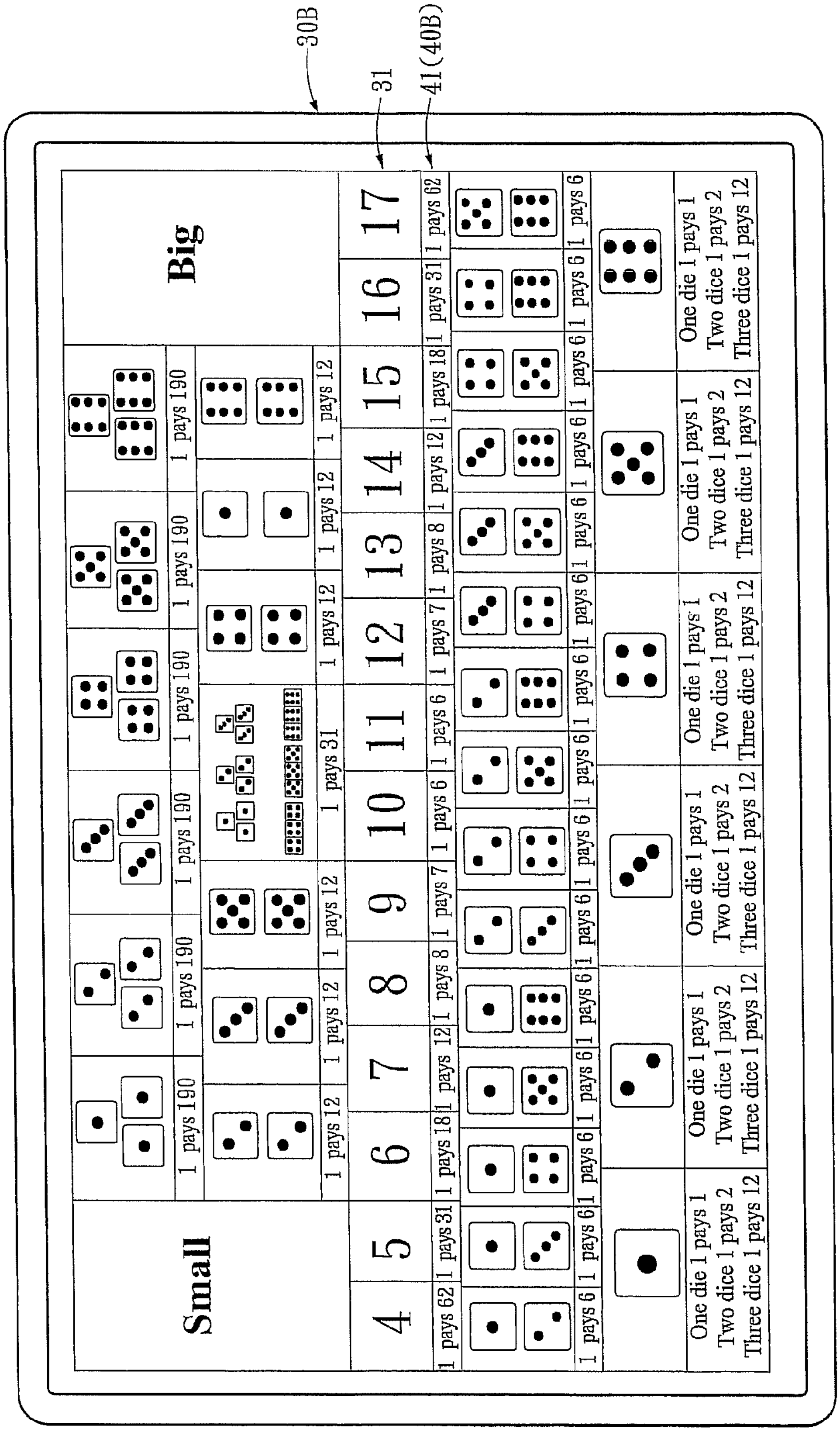
FIG. 6 is a schematic view of an electronic betting table on a real table according to the invention.
Figure 7:
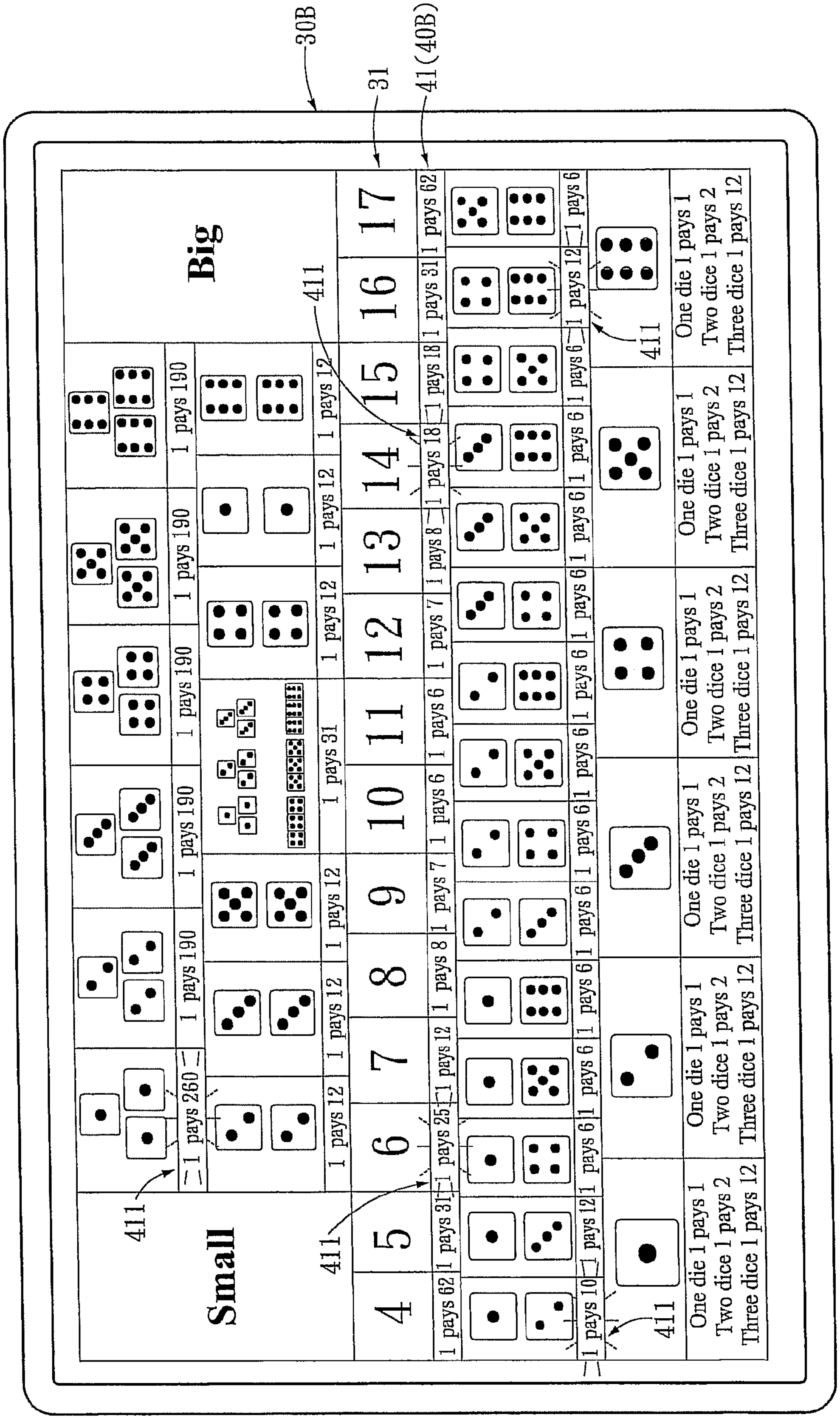
FIG. 7 is a schematic view of a real table with changed electronic betting multiple rates according to the invention.

Please refer to FIGS. 6 and 7 for another embodiment of the invention. The betting table 30B and electronic display panel 40B can be the combination of a real table and electronic display, with the display zones 41 on the electronic display panel 40B formed at a number mating the betting areas 31 on the betting table 30B. The betting table 30B also is embedded with the display zones 41 abutting the betting areas 31. The display zones 41 display electronically corresponding payout odds. After the raised odds of the dynamic raised odds 411 are generated, the player can clearly know the present raised odds of the dynamic raised odds 411. When the display zones 41 display the dynamic raised odds 411, they can be highlighted by changing the color, increasing luminosity or distinguished appearance so that the player can fully understand whether the showing contents on the display zones 41 are dynamic raised odds 411.

For example, with the pips combination total "10" and payout odds "1 pays 6", the corresponding display zone 41 displays "1 pays 6" (referring to FIG. 6). In the event that the raised odds of the dynamic raise odds 411 is "1 pays 10", the corresponding display zone 41 should be changed to display "1 pays 10", and is highlighted by changing the color, increasing luminosity or distinguished appearance (by increasing luminosity as shown in FIG. 7).

In the event that a greater number of the betting areas 31 exist, the embodiment previously discussed can overcome the problem of insufficient display zones 41 of the electronic display panel 40 to display all the betting areas 31, hence can meet requirements in practice.

As a conclusion, the invention can substitute the payout odds with the dynamic raised odds so that players can get payout according to the dynamic raised odds upon winning the bet, thus get a higher profit rate. Moreover, the dynamic raised odds appear and change frequently, hence are more appealing and offer more incentive for the players to place bets. As a result, utilization of the dice table increases. The player's profit rate can be controlled within an acceptable range so that due business benefit can be maintained intact.

What is claimed is:

1. An apparatus for dice table games allowing a banker and a player to play a dice table game, comprising:

a dice cup;

three dice held in the dice cup and shaken then being rested to still naturally to generate a random number to match at least one of pips combinations, each pip combination having a respective probability combined to define an overall game probability;

a betting table which includes a plurality of betting areas indicating the pips combinations that allow the player to place one or more bets and includes a payout odds for each of the plurality of betting areas to form a multiplication product by multiplying with the overall game probability that becomes a player's profit rate which is not greater than 100% by controlling the payout odds;

an electronic display panel to display at least one display zone corresponding to the plurality of betting areas and displaying a plurality of dynamic raised odds;

wherein, the banker selects, via the electronic display panel, a higher one between the payout odds and one of the plurality of dynamic raised odds as a payout for a player's bet corresponding to one of the plurality of betting areas;

wherein, the selected one of the plurality of dynamic raised odds each having an appearing probability;

wherein, an accumulated average odds being defined as an accumulation sum of the multiplication product of the plurality of dynamic raised odds and each corresponding appearing probability;

wherein, a player's raised profit rate being defined as a multiplication product of the accumulated average odds and the overall game probability;

wherein the player's raised profit rate is approximating to a set target value by controlling the plurality of dynamic raised odds and each corresponding appearing probability; and wherein, when the banker selects said one of the dynamic raised odds for the play of the dice table game, the player's profit rate is adjusted to said player's raised profit rate for the corresponding betting area.

2. The apparatus for dice table games of claim 1, wherein the electronic display panel is mounted upright at one side of the betting table.

3. The apparatus for dice table games of claim 1, wherein the betting table includes an electronic screen and the plurality of betting areas are displayed on the electronic screen.

4. The apparatus for dice table games of claim 3, wherein the electronic screen comprises a touch screen.

5. The apparatus for dice table games of claim 3, wherein the electronic display panel is incorporated in the electronic screen of the betting table.

6. The apparatus for dice table games of claim 1, wherein the selectable plurality of dynamic raised odds include definite values and numbers set anew by the banker at the beginning of each play of the dice table game.

7. The apparatus for dice table games of claim 1, wherein the at least one display zone is formed at a number corresponding to the betting areas and embedded on the betting table abutting the betting areas to display electronically the payout odds and to display the plurality of dynamic raised odds after generation thereof.

8. The apparatus for dice table games of claim 7, wherein the at least one display zone is changeable in color, luminosity or distinguished appearance to display the plurality of dynamic raised odds.

* * * * *